Figure 1:
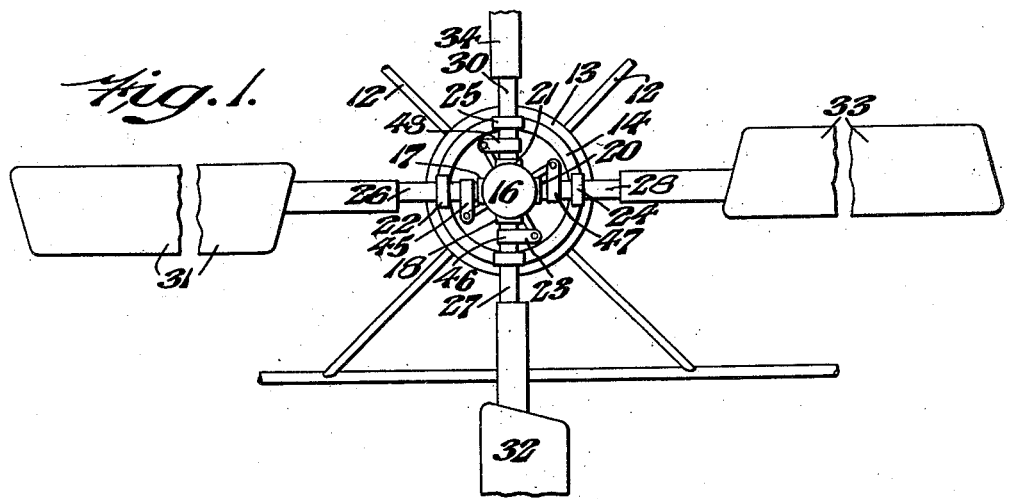

June 30, 1936.  E. B. WILFORD  2,045,623
AIRCRAFT
Original Filed July 16, 1931   2 Sheets-Sheet 1

INVENTOR.
EDWARD BURKE WILFORD,
BY Frank H. Borden
ATTORNEY

June 30, 1936. E. B. WILFORD 2,045,623
AIRCRAFT
Original Filed July 16, 1931 2 Sheets-Sheet 2

INVENTOR.
EDWARD BURKE WILFORD,
BY Frank H. Borden
ATTORNEY

Patented June 30, 1936

2,045,623

UNITED STATES PATENT OFFICE 2,045,623

AIRCRAFT

Edward Burke Wilford, Merion, Pa.

Application July 16, 1931, Serial No. 551,080
Renewed March 3, 1934

2 Claims. (Cl. 244—19)

This invention relates to aircraft and particularly to aircraft of the gyroplane type having a rotating wing system.

In gyroplanes it is well known that with fixed blades, rolling or pitching moments are developed owing to the differential lift developed on opposite sides of the axis of rotation of the gyroplane, as an incident of one blade moving into or against the relative wind, while the blade on the opposite side of the axis is moving with the relative wind. In order to secure equalized lift components on each side of the vertical axis, one type of gyroplane provides each blade with an articulated connection with the central hub of the rotating wing system, characterized as flexible, so that the blades are free to swing vertically about horizontal axes substantially tangential to the vertical axis. In gyroplanes of the pivoted or flexibly mounted blade type in which the attitude of each blade is a resultant of the opposing components of centrifugal force and vertical thrust, it has been necessary to provide stabilizing devices such as ailerons for securing control about a longitudinal axis and an elevator for securing control about a lateral axis.

It is an object of this invention to provide means for securing either lateral or longitudinal control, or both, of an aircraft of the gyroplane type from the rotating wing system itself, thus providing for the elimination of ailerons or other lateral stabilizing devices, or the elevators, or similar longitudinal controlling devices, or both.

It is an object of this invention to provide a gyroplane with a rotating wing system in which the blades or wings are freely pivoted to a central hub, with means under the control of the operator for selectively controlling the lift of any blade so as to secure either lateral or longitudinal, or both lateral and longitudinal, control and stabilizing of the gyroplane.

A further object of the invention is comprised in so disposing the "feathering" blades of a rotating wing system that diametrically opposite blades are coupled for simultaneous selective energization whereby the angle of incidence of each blade of the coupled pair of blades may be directly or differentially varied relative to the horizontal in such manner that the resultant lift from each blade may be predeterminedly different to secure desired rolling and/or pitching moments of the gyroplane.

A still further object is to provide a rotating wing system with a plurality of independent "feathering" blades, each of which is adjustable in one direction through one means such as aerodynamic action, but is adjustable in the other direction through a different means, so that the setting of any blade at any position in its path of rotation is a resultant of the operation of both means.

Further it should be noted that the means for selectively controlling the lift of any blade so as to secure lateral control, can be so employed as to balance the torque reaction of the power plant of the aircraft.

Although the invention relates to gyroplanes of the freely rotatable type responsive to aerodynamic reaction for their rotation, it will be clear that substantially similar means and mechanisms may be used with power driven devices such as helicopters, or to combinations of the helicopter drive with the freely rotatable aerodynamically reacted rotating wing systems, and such broad interpretation is to be construed as within the scope of the invention and of the appended claims.

There are additional objects and advantages of the invention as will become more apparent as the description proceeds.

Figure 2:
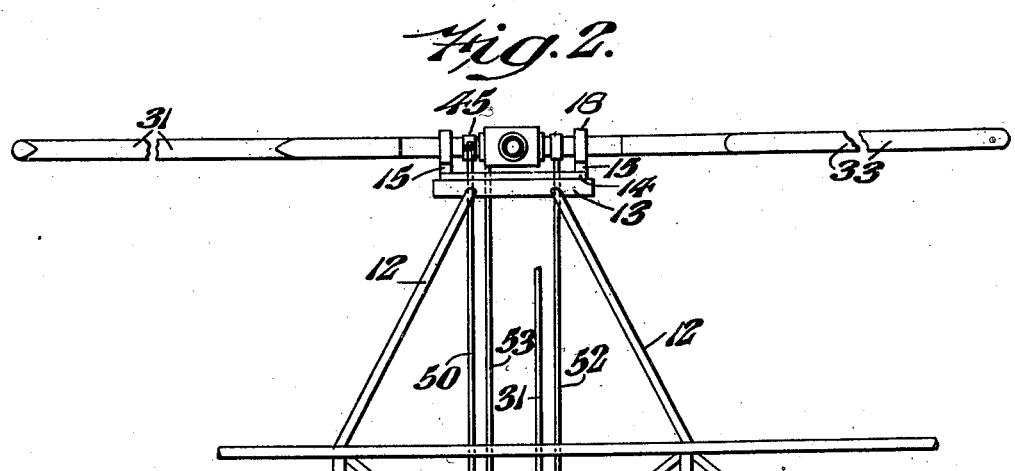
Figure 3:
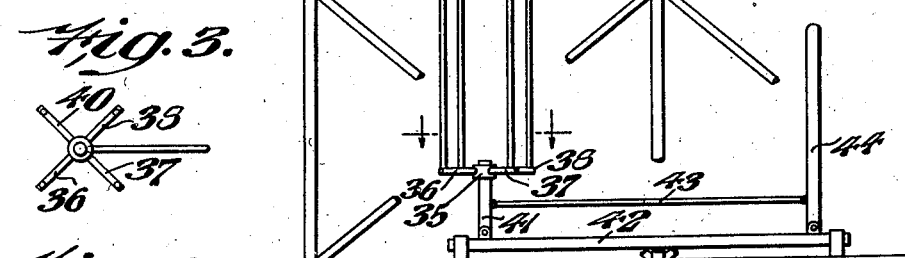
Figure 7:
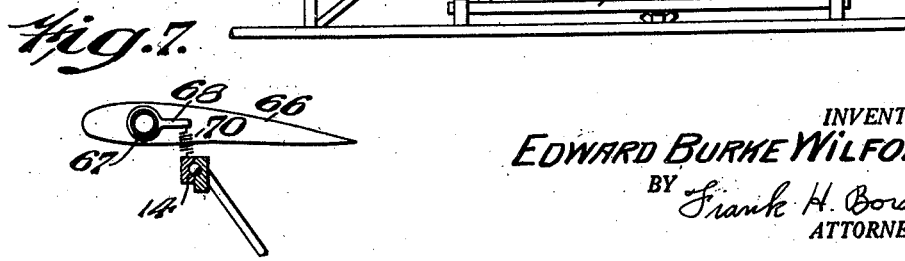
Figure 4:
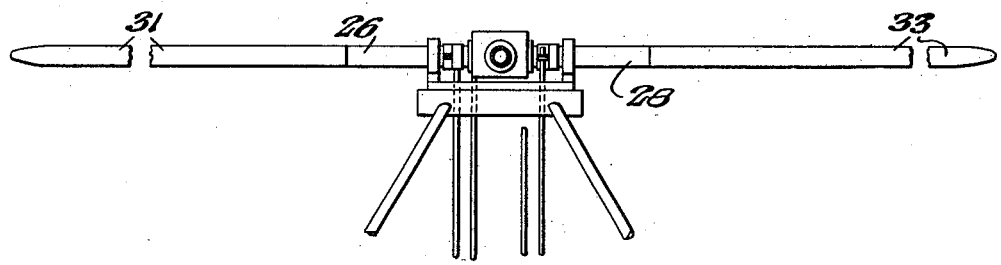
Figure 5:
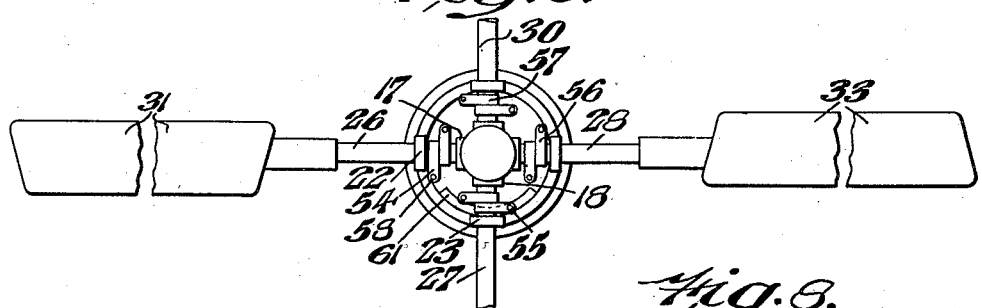
Figure 6:
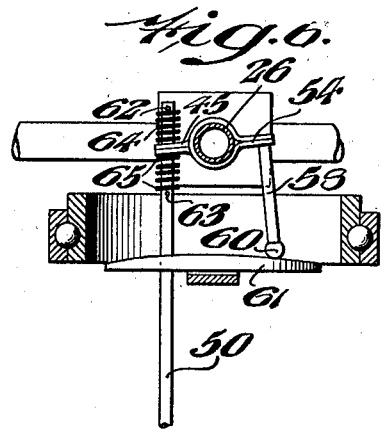
Figure 8:
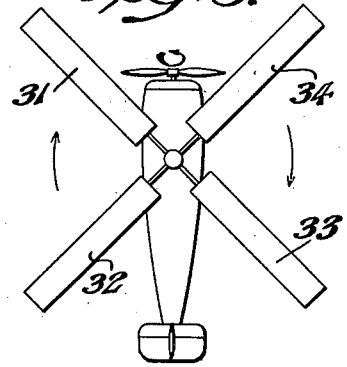

In the accompanying drawings:

Fig. 1 represents a fragmentary plane view of an illustrative form of rotating wing system according to the invention, Fig. 2 represents a fragmentary side elevation thereof, Fig. 3 represents a fragmentary detail of a portion of the controlling mechanism which may be used, Fig. 4 represents a fragmentary elevation of a modified form of the invention, Fig. 5 represents a fragmentary plan of the modification shown in Fig. 4, Fig. 6 represents a fragmentary enlarged detail of the device shown in Figs. 4 and 5, Fig. 7 represents a fragmentary diagrammatic section, partially in full lines of a further modified form of the invention, and Fig. 8 represents a plan of the gyroplane thereof.

Referring to Fig. 2 the longerons 10 and 11 of the fuselage (not shown) support the conical framework comprised of rigid arms 12 joined to the fixed ring 13, the axis of which forms the axis of rotation of the rotating wing system to be described. The ring 13 supports the thrust bearing 14 in rotatable relation. The thrust bearing 14 supports arms 15, peripherally spaced at 90° from each other, and may, through other arms, (not shown), support the central bearing element 16. The latter comprises a block having a plurality of bearings 17, 18, 20, and 21, preferably of long axes. The central bearing element may, however, have substantially floating relation as regards the bearing 14, and be rigidly held by the shafts to be described, as illustrated in a diagrammatic manner.

The arms 15 on bearing 14 respectively support and hold thrust bearings 22, 23, 24, and 25, each of which is coaxial with one of the bearings in the central bearing element. Thus the bearings on the ring and on the central block are arranged in pairs with their axes extending radially of the vertical axis of the rotating unit.

Shafts 26, 27, 28, and 30 are provided in the several pairs of bearings, as shaft 26 mounted in bearings 22 and 17, shaft 27 in bearings 23 and 18, etc. Shaft 26 carries the rigid blade 31, while shafts 27, 28, and 30, respectively carry rigid blades 32, 33, and 34. The blades are preferably of airfoil contour and may be disposed in such manner that the center of pressure of any blade is either out of registry or in registry with the axis of the particular blade, according to the manner of control which is employed as will be explained later.

A rotatable spoked wheel 35 having spokes 36, 37, 38, and 40 is journalled on lever arm 41, pivoted at its lower end to swing in a longitudinal path on the rocker bar 42 by means of a link 43 connected pivotally to the control stick 44 pivoted to the rocker bar. The spoked wheel is swung laterally when stick 44 moves laterally.

Each shaft is provided with an offset ear, as 45, 46, 47 and 48, preferably rigid with the shaft. Each ear connects with its appropriate spoke by means of one of the links 50, 51, 52 or 53. Preferably the connection of the link to the ear is with a lost motion, as by providing suitable stops on each side of the ear on the respective links as shown in Fig. 6.

The control mechanism disclosed is, of course, purely illustrative, and any other control means, such for instance as hydraulic, electric, pneumatic, or the like may be utilized. It will be understood that the spoked wheel rotates with the rotatable wing system disclosed, but is capable of universal positioning in accordance with the movements of the stick 44 during such rotation. It is better to have the universal pivot as close to the center of the spoked wheel as possible. With the spoked wheel lying in a plane parallel with the plane of rotation of the shafts there will be no controlling functions manifested. As it departs, however, it will be observed that the links on one side of the wheel will be pulled downwardly while those on the opposite side will be forced upwardly. Through the connection of the links with the ears on the respective shafts it will be observed that the shafts will be turned on their axes in one direction on one side of the axis of rotation of the system, while those on the opposite side of the vertical axis of rotation will be oscillated in the other direction. This differential movement clearly changes the angle of incidence of the respective blades to vary the effective lift on each side of the vertical axis of rotation and thus secures stabilizing control, or a desired rolling or pitching moment.

Owing to the lost motion connection it is possible to control the shafts on one side of the vertical axis without affecting those on the other if this be desirable. This, for instance by having the bottom stop on a link normally closer to the ear than the top stop of that link, so that the push upwardly of the link causes engagement of the ear and movement of the shaft, while the pull down of the same link on the other side of the axis of rotation will not bring the top stop into engagement with the ear so that it is not moved.

The lost motion connection is desirable from the standpoint that it is better to permit the blades to have free and unrestricted oscillation than to have it restrained except momentarily to secure a desired controlling function.

Without such lost motion connection, however, it will be observed that although the blades are not connected together so as to oscillate in pairs through a direct connection, they are, however, directly oscillated in opposite directions through the link connection with the spoked wheel so that differential changes of angles of incidence are achieved resulting in different effective lifts as are desired.

In the disclosure of Figs. 3, 4, and 5, the structures may be the same as those of Figs. 1 and 2, so that similar characters may be used to describe the several parts, except for the additional features which will be pointed out. Thus shaft 26 has an ear 45 to which the link 50 is attached, and the other shafts are also so provided, so that control of the oscillation of the shafts and thus the angle of incidence of the respective blades may be manually varied and controlled. Shaft 26 has an oppositely disposed substantially radial lug 54, while the other shafts support respectively the other lugs 55, 56, and 57. Rigidly mounted on each lug is a depending stud arranged for wiping engagement with the cam to be described. Thus the stud 58, having the roller 60, is mounted on the ear or lug 54 of shaft 26. It will be seen that upward movement of the stud will oscillate the shaft 26 and thus change the angle of its attached blade.

In connection with the disclosure of Figs. 4 and 5 it may be noted that the disposition of the respective blades on their shafts need not be arranged to have the center of pressure on the blade out of registry with the axis of the shaft, as aerodynamic reaction to secure oscillation in one direction need not be used in the case illustrated, as there is provided other means to secure movement of the blades in each direction.

A segmental cam surface 61 is preferably movably mounted in such position as to be successively engaged by the roller 60 of each depending stud as the wing system rotates, as to impart a degree of oscillation to the respective shafts and blades as they follow the rotation of the system that the lift of any blade is the same, substantially, at all positions in the path of rotation. Such equalization of lift is secured regardless of the differential reaction incident to the blades on one side going into the wind while those on the opposite side are going with the wind, and is primarily to obviate rolling moments. The segmental cam 61 is preferably made adjustable arcuately about the vertical axis of rotation so that the normal setting may be proper for the individual wing system, and is also arcuately adjustable through a wide arc so that under the control of the pilot the cam may be adjusted to secure a desired rolling or pitching moment. The cam segment 61 is also preferably adjustable vertically parallel with the vertical axis so as to vary the degree of oscillation to which the respective blades are subjected.

As shown in Fig. 6 the link 50 is attached to its ear 45 through a lost motion connection, such as may be provided by shock absorber means as illustrated. Thus the upper stop for the link may consist of the pin 62, and the lower stop by pin 63. If the stops so provided were in spaced relation to the ear through which the link slides it will be apparent that appreciable relative motion of the ear and link may take place without any restraining action becoming apparent. The ear may be spaced from the upper stop 62 by means of a resilient element 64, and from the lower one by resilient element 65. These elements are shown as coiled springs, but obviously may be rubber blocks or the like, or they may consist in sleeves having no resilience, but varying, according to their length, the degree of lost motion provided by the upper and lower stops 62 and 63. It will be apparent that in rotation the cam 61 will periodically oscillate each blade to decrease its angle of incidence, or to increase same, according to the position of the lugs and studs, and according to which is found more desirable. The links controlled by the operator may be used to oscillate the blades at other intervals in a desired direction to obtain a desired rolling or pitching moment. Actuation of the control links may be in addition to the cam operation, or may be accompanied by withdrawal of the cam from a position in which it is impinged, so that desired rolling or pitching moments may be secured.

An important feature of the invention is illustrated diagrammatically in Fig. 7. Appreciating that with the center of pressure of a blade lying behind the axis of oscillation or feathering of the blade, a torque is imposed on the blade urging it to feather or oscillate so as to change its angle of incidence, and that this torque, an incident of aerodynamic reaction, varies according to the reaction and thus to both the angle of incidence and the relative speed of the blade and the air, it is possible to provide an opposing torque so arranged that the attitude of the given blade is always a resultant of the opposing torques, or determined when the opposing torques are in a state of balance.

Assume a blade 66, or airfoil contour, mounted on a shaft 67, which shaft is suitably journalled for oscillation, as in the earlier described structures. The blade is so disposed relative to the shaft that the center of pressure lies well behind the axis of the shaft so that as the blade moves into the wind in the rotation of the system, the torque imposed by aerodynamic action urges the blade to decrease its angle of incidence. The shaft or some part of the blade carries the ear or lug 68. An opposing torque creating device such as a spring 70 is provided engaging the lug 68 and some relatively immovable part of the system such as the thrust bearing 14. Assume that the wing system includes a plurality of such independently oscillatable blades.

With the spring tension carefully estimated it may be observed that in the course of one rotation, the blade under consideration first travels, for instance, against the relative wind, which generates a high pressure, manifested at the center of pressure, and a torque such as to overcome the initial resistance of the spring 70, and the torque which the spring imposes on the blade, to oscillate the blade on its axis on shaft 67 to decrease the angle of incidence of the blade, and thus to decrease the pressure torque. The attitude of the blade will be determined when the opposing torques are in a state of substantial balance. As the wing system rotates the pressure manifested at the center of pressure on the blade will gradually decrease as the blade moves toward that part of its path where it is traveling with the relative wind. Decrease of the pressure or aerodynamic torque will result in the spring torque overcoming the aerodynamic torque to cause oscillation of the blade so as to increase its angle of incidence. Thus the blade on opposite sides of the vertical axis of rotation will have substantially equalized lift factors although the angle of incidence of the blades may be appreciably divergent.

In an aircraft equipped with a power plant driving a forward propeller, a reaction torque is developed which has to be counteracted by some form of lateral control. The actuation of the lateral control, as for example actuation of conventional ailerons, may introduce a yawing torque which has to be compensated for by use of the rudder.

By the various means provided for securing lateral control in this invention, the reaction torque of the power plant, which is shown counterclockwise in Fig. 8, may be balanced without a yawing torque being introduced. Therefore, reaction torque of the propeller may be balanced without it being necessary to use the rudder. This feature of the invention is of importance as it reduces strain and eliminates vibration in the gyroplane, as well as rendering the controls more accurately responsive to the pilot's operations.

It has been found that owing to the inertia of the blades there is such a time lag in their reaction that a small residual rolling moment may exist in the system which has heretofore exerted a rolling moment about the longitudinal axis of the gyroplane unless suitably compensated. One form of compensation has involved offsetting the mast of the gyroplane a few degrees from the vertical. It is an important feature of this invention to utilize the reaction torque of the power plant to provide an opposite and cancelling rolling moment about the longitudinal axis of the gyroplane. This is illustrated in Fig. 8 and is secured by providing the rotating wing system of such proportion and turning in such direction as to develop a residual rolling moment which is opposed by the reaction torque of the power plant illustrated. The direction of rotation of the two systems (wing system and power system) is such as might be derived if the power plant were coupled through bevelled gears to the mast of the wing system. In other words, if, from the cock-pit, the power plant is turning clockwise then looking up the rotating wing system also turns clockwise. By this means the necessity for disadvantageous compensating for the residual rolling moment is obviated by utilizing the torque of the motor which is always present.

I claim:

1. In gyroplanes, a hub, a shaft extending from the hub, a blade on the shaft, a cam, means mounted on the shaft and arranged to engage the cam to oscillate the shaft during the rotation of the hub, said cam being adjustable to vary the degree of oscillation of said shaft, and means operatively associated with the shaft and arranged under the control of the operator to oscillate said shaft independently of said cam.

2. In a rigid feathering normally aerodynamically driven rotor system, a fixed support, a rotatable hub journalled on the support arranged to rotate relative to an axis, a pair of bearings mounted on the hub with their axes substantially perpendicular to said axis of rotation and being peripherally spaced relative to each other, a substantially concentric rotatable supporting structure having peripherally spaced bearings arranged to be substantially aligned with the respective first mentioned bearings, shafts journalled in the pairs of aligned bearings, blades on the shafts, and a control system engaging the respective shafts between aligned bearings to successively feather each blade during rotation of the system.

EDWARD BURKE WILFORD.